United States Patent [19]

Disteldorf et al.

[11] Patent Number: 4,598,121
[45] Date of Patent: Jul. 1, 1986

[54] COLD-CROSSLINKING POLYURETHANE DISPERSIONS, MANUFACTURE AND USE OF THE SAME

[75] Inventors: Josef Disteldorf; Hans-Jurgen Haage; Horst Schnurbusch, all of Herne, Fed. Rep. of Germany

[73] Assignee: Chemische Werke Huls AG, Marl, Fed. Rep. of Germany

[21] Appl. No.: 741,359

[22] Filed: Jun. 5, 1985

[30] Foreign Application Priority Data

Aug. 24, 1984 [DE] Fed. Rep. of Germany ....... 3431144

[51] Int. Cl.$^4$ .............................................. C08G 18/32
[52] U.S. Cl. .................... 524/874; 427/385.5; 528/61
[58] Field of Search .......... 524/874; 528/61; 427/385.5

[56] References Cited

U.S. PATENT DOCUMENTS 4,305,858 12/1981 Reischl ................................. 524/874
4,324,716 4/1982 Reischl et al. ....................... 524/874

Primary Examiner—Maurice J. Welsh
Attorney, Agent, or Firm—Oblon, Fisher, Spivak, McCelland & Maier

[57] ABSTRACT

A method for preparing an aqueous polyurethane dispersion, comprising (a) preparing a prepolymer with free NCO groups by reacting an aliphatic or cycloaliphatic polyisocyanate with a polyol, and an anionic compound; (b) dispersing said prepolymer in water; (c) reacting said water-dispersed prepolymer with a diamino hydrazide of the formula:

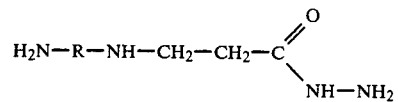

wherein R is an alkylene group of 2 to 15 carbon atoms or a cycloalkylene or arylene group of 6 to 15 carbon atoms as a chain lengthening agent; (d) reacting the prepolymer of step (c) in said dispersion with formaldehyde to effect crosslinking.

10 Claims, No Drawings

COLD-CROSSLINKING POLYURETHANE DISPERSIONS, MANUFACTURE AND USE OF THE SAME

BACKGROUND OF THE INVENTION

1. Field of the Invention

The invention relates to cold-crosslinking polyurethane (PUR) dispersions which are utilized in the coating of surfaces, and for the manufacturing of films, sealing materials, and leather dressings.

2. Description of the Background

Emulsifier-free "ionomer" dispersions based on PURs have proven themselves in practice. The reason for their commercial success is attributed to their high mechanical and chemical stability, their extraordinary film-forming properties, their good adhesion to surfaces, and their high susceptibility to engineering variations of composition and properties.

PUR dispersions are customarily prepared as follows: A prepolymer is prepared from a polyisocyanate and a polyol, with the polyol being added to the polymerization medium in less than the stoichiometric amount. The prepolymer is then reacted with a compound which confers emulsifying properties to the resulting ionomer. A dispersion is produced, chain extension is carried out, and the solvent is removed by the so-called "acetone process" (see Angew. Makromolek. Chemie, 1981, 98:133–165). The remaining free NCO groups of the prepolymer are available for reaction with a chain extending agent. Such a method is described, e.g., in Canadian Pat. No. 837,174. The resulting strongly crosslinked products are not soluble in solvents, however, nor do they coagulate to form unitary films (see German Patent AS No. 26 24 442).

The dispersions which are used in the preparation of the product of German Patent AS No. 2624442 are prepared as follows: First, a prepolymer is prepared which has anionic salt groups, as well as residual NCO groups, and has a viscosity of 50 to 10,000 mPa-sec. The prepolymer is reacted with compounds having active hydrogen atoms which react with the NCO groups of the isocyanate compound more rapidly than does water. Suitable such compounds include ammonia, primary and secondary amines, preferably diamines, and hydrazine derivatives (column 13, lines 35 ff.) which are hydrazides of dicarboxylic acids and sulfonic acids, e.g. adipic acid mono- and di-hydrazide (column 14, lines 13 ff.). It is desirable if a limited conversion of the NCO-group-containing prepolymer with water takes place, but it is assumed that the good dispersibility of the products is attributable to the formation of urea bonds, as well as carbamic acid groups (see column 4, lines 16 ff.). The dispersions have the disadvantage that resistance to solvents cannot be achieved merely by the addition of crosslinking agents and consequent crosslinking at temperatures under 100° C.

It is also known that the said prepolymer can be reacted with polyisocyanates (see Ger. OS No. 32 33 605).

In the method described in German OS No. 32 38 169, linear anionic prepolymers are lengthened with diamines and then the product is reacted with a crosslinking agent such as, e.g., a methoxymethylated melamine or urea, at temperatures above 150° C., and are crosslinked. Crosslinking of the prepolymer will not occur at room temperature. However, room temperature crosslinking is desirable since many substrates are not thermostabile.

In another method as described in German OS No. 31 40 873 (corresponding to U.S. Pat. No. 4,335,029) a multifunctional anionic ionomer having hydrazide groups in the form of carboxylic acid hydrazides is prepared. The hydrazide groups are reacted with formaldehyde to yield reactive methylol groups containing compounds (see Ger. OS No. 18 07 072). The advantage of this method is that, following coagulation at room temperature, a condensation reaction can be carried out via the methylol-hydrazide groups. However, a disadvantage of this method is that solvent resistance can be attained only if the starting ionomers have a functionality greater than 2, which ionomers are therefore necessarily highly viscous. Preparing a dispersion requires special dispersing equipment which can produce very high shear stresses. As a result of inhomogeneity, this method leads to films with irregular flow properties, as shown in Comparison Example A, infra, inferior gloss after pigmentation, and increased susceptibility to degradation by water and alkalis. It would be desirable if the crosslinking reaction could be conducted immediately after the dispersion operation.

A need continues to exist for an aqueous polyurethane dispersion of improved characteristics.

SUMMARY OF THE INVENTION

Accordingly, one object of the present invention is to provide a method for preparing aqueous PUR dispersions.

Another object of the present invention is to provide an aqueous crosslinked polyurethane dispersion.

Yet another object of the present invention is to provide a method of producing resin films from an aqueous polyurethane dispersion.

Briefly, these objects and other objects as hereinafter will become more readily apparent can be attained in a method for preparing an aqueous polyurethane dispersion by preparing a prepolymer with free NCO groups by reacting an aliphatic or cycloaliphatic polyisocyanate with a polyol, and an anionic compound, dispersing said prepolymer in water; reacting said water-dispersed prepolymer with a diamino hydrazide of the formula:

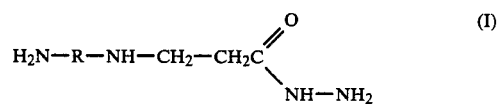

wherein R is an alkylene group of 2 to 15 carbon atoms or a cacloalkylene or arylene group of 6 to 15 carbon atoms as a chain-lengthening reagent, and then reacting the resulting product with formaldehyde to effect crosslinking;

DESCRIPTION OF THE PREFERRED EMBODIMENTS

The present invention was discovered as a result of the recognition that dicarboxylic acid hydrazides, e.g., adipic dihydrazide, are not very suitable for crosslinking the prepolymer. Research has shown that the hydrazide groups are relatively unreactive with the free NCO groups of an ionomer formed from isophorone diisocyanate, for example, (see Example 4.1). Consequently, the reaction of the ionomer with water amounts to a serious side reaction (see Table 1, infra). Similar results were obtained with ionomers formed from other isocyanates.

The reaction with water is undesirable, since it makes no contribution to branching. In this sense the reaction of the prepolymer with a dihydrazide, is also unsatisfactory. In particular, for statistical reasons the desired reaction of one hydrazide group with the prepolymer (with the other hydrazide group left free) is not the only reaction. Rather, to a substantial degree the reaction of both functional groups of the dihydrazide must be taken into account. As a result, the number of the hydrazide groups which become bound to the prepolymer and which are available for subsequent crosslinking via formaldehyde is greatly reduced.

However, if a diamino hydrazide according to Formula I supra is employed, a selective reaction occurs, because of the substantially higher reactivity of the amino group. The competing reactions are minimized. This procceding enables one to start out with prepolymers with a lower degree of crosslinking, which are thereby easier to handle.

The present invention is distinguished by the following advantages:
1. A prepolymer with a low degree of crosslinking is prepared which is relatively less viscous and thereby stirrable and easy to handle.
2. A substantial degree of crosslinking is achieved only after the coagulation of the dispersion.
3. Films are obtained which are hard, and highly crosslinked, and have improved resistance to solvents.

In the following section the individual steps of the method are described.

First, a prepolymer is prepared from a polyisocyanate, a polyol, and an anionic compound. The solvent used in the reaction is preferably N-methylpyrrolidone and/or acetone. The catalyst can be dibutyltin dilaurate ("DBTL"). The polyisocyanate which is employed is selected from among the following isocyanates:
1. Aliphatic or cycloaliphatic diisocyanates with up to 12 carbon atoms. Preferred compounds are cycloaliphatic diisocyanates with 6 to 15 carbon atoms, particularly isophoronediisocyanate (IPDI).
2. Adducts of the diisocyanates mentioned in (1.) with the polyols described infra, particularly trimethylolpropane ("TMP"—2-ethyl-2-hydroxymethyl-1.3-propandiol), and/or with melamine.
3. Oligomers of the diisocyanates mentioned in (1.), preferably isocyanurates.

The polyol which is employed is selected from among the following OH group containing compounds having a molecular weight ranging between 500 and 2000:
1. Polyesters comprised of the following acid and alcohol components:
    (a) Aliphatic and aromatic dicarboxylic acids with 5 to 15 carbon atoms, or anhydrides thereof; e.g., adipic acid, decanedicarboxylic acid, isophthalic acid, and phthalic anhydride.
    (b) Polyols with 2 to 15 carbon atoms and 2 to 4 OH groups per molecule, e.g., ethylene glycol, diethylene glycol, 1,4-butanediol, neopentyl glycol, 1,6-hexanediol, trimethylolpropane (TMP), and pentaerythritol.
2. Linear and trifunctional polycaprolactones. Such products are prepared from difunctional compounds, for example, water and ethylene glycol, or trifunctional compounds, for example, TMP, in the presence of tin catalysts at temperatures up to 160° C.
3. Polyethers based on glycols such as polypropylene glycol, polybutylene glycol, and the like.

The anionic compound employed is a carboxylic or sulfonic acid having 10 or fewer carbon atoms. Suitable such anionic compounds include diaminocarboxylic acids, diaminosulfonic acids, and dihydroxycarboxylic acids. Preferred is dimethylolpropanoic acid.

The free acid groups of the prepolymers are then neutralized by addition of a base. Suitable examples of bases include alkali hydroxides and tertiary amines. Preferred is triethylamine.

The prepolymer containing free isocyanate groups is one which preferably has a linear molecular structure. The viscosity of the prepolymer in solution, which is an at least 70 wt.% solution, should be at most 10,000 mPa-sec. The free NCO groups of the ionomer undergo chain lengthening via the amino groups of the diamino hydrazide reactant.

The neutralized prepolymer is not shelf-stabile. It therefore needs to be employed quickly in further conversions. A water dispersion of the prepolymer is prepared, at strong stirring speeds (c. 100 rpm), wherewith an amount of water is added amounting to one to three times by weight of the amount of prepolymer.

As soon as the dispersion attains homogeneity, about a 30 wt.% aqueous solution of the diamino hydrazide of formula I is added directly and all at once to the dispersion with stirring. Finally, a dilute formalin solution is added at a temperature of c. 45° C., and the reaction is allowed to proceed at this temperature for about 30 min until methylol formation is complete. This is a known crosslinking technique.

The diamino hydrazide I is prepared by reacting a diamine of formula $H_2N-R-NH_2$ with 0.2 to 2 moles of an acrylic acid derivative, preferably ethyl acrylate, and then the product obtained is reacted with hydrazine.

Suitable diamines of the formula:

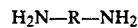

$H_2N-R-NH_2$ include aliphatic diamines of 2 to 15 carbon atoms and cycloaliphatic and aromatic diamines with 6 to 15 carbon atoms such as ethylenediamine, 1,4-butanediamine, 1,6-hexanediamine, 2,2,4-trimethyl-1,6-hexanediamine, 2,2,4- and 2,4,4-trimethyl-1,6-hexanediamine, bis(4-aminocyclohexyl)methane, and di(aminomethyl)benzene. Isophoronediamine is the preferred diamine.

The prepared dispersion is applied to a smooth surface such as a glass or metal surface by means of, e.g., a doctor blade or putty knife.

Having generally described this invention, a further understanding can be obtained by reference to certain specific examples which are provided herein for purpose of illustration only and are not intended to be limiting unless otherwise specified.

EXAMPLE 1

Preparation of a diaminohydrazide as a chain lengthening agent

In a one liter three-necked flask equipped with stirrer, reflux condenser, gas bubbling tube, and dropping funnel, 170.0 g (1 mole) isophorone diamine was charged under nitrogen and was heated to 45° C. with stirring. 100.0 g (1 mole) ethyl acrylate was added dropwise with stirring over a period of 90 min at a temperature of 45°–50° C. The reaction mixture was then stirred moderately for an additional 7 hours at this temperature. At the conclusion of the 7 hrs, the acrylate had been fully reacted. The product had an index of refraction $n_D^{25}=1.4765$. 50.0 g (1 mol) hydrazine hydrate ($N_2H_4.H_2O$) was added all at once with stirring at a temperature of 50° C. The mixture was carefully heated to 65° C., with continued stirring. At about 60° C. the reaction began to mildly liberate heat. After 5 hrs, when the initial turbidity had disappeared, the reaction had been completed.

The product was tested by potentiometric titration. The primary and secondary amino groups were determined with HCl using isopropanol as the solvent. The titration with HCl gave 6.28 mmol amine/g (theoretical=6.25).

EXAMPLE 2

General description of the preparation of the dispersion

In a three-necked flask dimethylolpropanoic acid, with the optional trimethylolpropane, along with N-methylpyrrolidone and/or acetone, was charged and was heated to 60° C. under gentle stirring. The polyol and dibutyltin dilaurate were then stirred in. The required amount of IPDI was then added at a rate such that the reaction temperature did not exceed 80° C. After about 5 hrs of reaction time, when the theoretical NCO number had been attained, the mixture was allowed to cool. Then triethylamine was added to neutralize the mixture, a stirrer speed of 100 rpm was established, and water was added over a period of 1 min. As soon as a homogeneous solution had formed, a 30% aqueous solution of the hydrazide (Example 1 supra) was added over 1 min. In this addition, care was taken that the aqueous solution flowed directly into the developing dispersion with as little contact with the interior wall of the reaction flask as possible. After 5 min, the stirring speed was reduced. The mixture was held 2 hr at 45° C. The 37 wt.% aqueous formalin solution was added, and the resulting mixture was held for 1 additional hour at 45° C. After cooling, the mixture was filtered through a filter cloth. When acetone was used as the solvent, it was evaporated in a rotary evaporator at a maximum of 60° C., at reduced pressure. The resulting dispersion had a solids content of ca. 30 wt.%.

EXAMPLE 2.1

Preparation of the crosslinked dispersion when other diamines are used

For the case of other diamines, e.g., ethylenediamine, 1,6-hexanediamine, 2-methyl-1,5-pentanediamine, 2,2,4- or 2,4,4-trimethyl-1,6-hexanediamine, similar results were obtained.

EXAMPLE 3

Polyols

EXAMPLE 3.1

From 4 mol adipic acid, 3 mol neopentyl glycol, and 2 mol 1,6-hexanediol, a linear polyester with an OH number of 110 was prepared.

EXAMPLE 3.2

A polybutylene glycol with a molecular weight of 1000 was employed; such a product is commercially available under the name Terathane ®1000 (from du Pont, USA).

EXAMPLE 3.3

A polybutylene glycol with a molecular weight of 2000 was employed; such a product is commercially available under the name Terathane ®2000 (from du Pont, USA).

EXAMPLE 3.4

A polycaprolactone with a molecular weight of 2000 was employed; such a product is commercially available under the name Capa ®220 (mfr. Solvay & Cie., B-1050 Brussels).

EXAMPLES 4.1 TO 4.4

The polyols of Examples 3.1 to 3.4 were used to make dispersions with formulations as per Table 2, infra, using the method of Example 2.

TABLE 1: Conversion of the NCO groups of an ionomer prepared from IPDI (Example 4.1) and ethylenediamine and adipic acid dihydrazide in water. The data are percent conversion.

TABLE 1

| Time [Min] | Ethylenediamine in a stoichiometric amount in the presence of water | Adipic acid dihydrazide in a stoichiometric amount in the presence of water | Water |
|---|---|---|---|
| 0.5 | 100 | 10 | 5 |
| 1.0 | 100 | 25 | 10 |
| 5.0 | 100 | 50 | 13 |
| 10.0 | 100 | 55 | 15 |
| 20.0 | 100 | 72 | 21 |
| 30.0 | 100 | 80 | 23 |
| 60.0 | 100 | 84 | 30 |
| 120.0 | 100 | 86 | 40 |
| 180.0 | 100 | 88 | 43 |
| 240.0 | 100 | 90 | 45 |

TABLE 2

FORMULA

| Component | Example 4.1 Equivalent/parts by wt. | | Example 4.2 Equivalent/parts by wt. | | Example 4.3 Equivalent/parts by wt. | | Example 4.4 Equivalent/parts by wt. | |
|---|---|---|---|---|---|---|---|---|
| Polyester of Ex. 3.1 | 1.00 | 510.0 | — | — | — | — | — | — |
| Polyether of Ex. 3.2 | — | — | 1.00 | 500.0 | — | — | — | — |
| Polyether of Ex. 3.3 | — | — | — | — | 1.00 | 1000.0 | — | — |
| Polyester of Ex. 3.4 | — | — | — | — | — | — | 1.00 | 1000.0 |
| Trimethylolpropane | 0.30 | 13.4 | 0.20 | 8.9 | 0.10 | 4.5 | — | — |
| Dimethylolpropionic acid | 0.60 | 40.2 | 0.50 | 33.5 | 0.70 | 46.9 | 0.70 | 49.9 |
| IPDI | 3.04 | 337.5 | 2.72 | 301.9 | 2.88 | 320.0 | 2.72 | 302.0 |
| N—Methylpyrrolidone | — | 362.0 | — | 100.5 | — | — | — | — |
| Triethylamine | 0.30 | 30.3 | 0.25 | 25.2 | 0.35 | 35.4 | 0.35 | 35.4 |
| Isophorondiamine-propionic acid hydrazide | 0.513 (Mol) | 134.6* | 0.459 (Mol) | 123.9* | 0.486 (Mol) | 152.0 | 0.459 (Mol) | 123.9* |

TABLE 2-continued

| Component | Example 4.1 Equivalent/parts by wt. | | Example 4.2 Equivalent/parts by wt. | | Example 4.3 Equivalent/parts by wt. | | Example 4.4 Equivalent/parts by wt. | |
|---|---|---|---|---|---|---|---|---|
| Formaldehyde | 0.40 | 32.0 | 0.36 | 28.6 | 0.38 | 0.31.0 | 0.36 | 28.6 |
| Acetone | — | — | | 400.0 | | 200.0 | | 1300.0 |
| Distilled Water | | 1900.00 | | 2100.00 | | 4500.0 | | 3500.00 |
| Dibutyltin dilaurate | | 0.4 | | 0.4 | | 0.4 | | 0.4 |

*Based on 100% product

TABLE 3
PROPERTIES OF INVENTIVE DISPERSIONS AND FILMS

| | Example 4.1 | Example 4.2 | Example 4.3 | Example 4.4 |
|---|---|---|---|---|
| Appearance | White | White | White | White |
| Solids Content (wt %) | 33 | 34 | 35 | 30 |
| Charge of Particles | Anionic | Anionic | Anionic | Anionic |
| Particle Size | Colloidal | Colloidal | Colloidal | Colloidal |
| pH At 25° C. | 7.5 | 7–7.5 | 7.5–8 | 7.5–8 |
| Viscosity at 25° C. | 15.5 mPa-s | 18.1 mPa-s | 179 mPa-s | 218 mPa-s |
| Flash point (enclosed) °C. | >93 | >93 | >93 | >93 |
| Volatile Organic Components (wt %) | 10.7 | 3.2 | — | — |
| Density g/cc | 1.043 | 1.024 | 1.013 | 1.012 |
| Solidifying Point (°C.) | −3 | −1 | 2 | 3 |
| Film Properties | | | | |
| Tensile Strength N/mm$^2$ | 45 | 43 | 37 | 39 |
| Elongation % | 200 | 250 | 420 | 510 |
| Osram-Sylt-Test | 1000 h-ok | 1000 h-ok | 1000 h-ok | 1000 h-ok |
| Koenig Pendulum Hardness (sec) (DIN 53 157) | 100 | 90 | 40 | 55 |
| Erichsen Penetration (mm) (DIN 53 156) | >10 | >10 | >10 | >10 |

COMPARISON EXAMPLE A

[analogous to Ger. OS 31 40 873]

375 g (0.5 equivalent) of a linear polyester according to Example 3.3, 33.6 g (0.8 equivalent) melamine, and 355.2 g (3.2 equivalents) IPDI were brought to reaction over 3 hr in the presence of 0.05 wt.% dibutyltin dilaurate and 350 g N-methylpyrrolidone at 140° C. Then 53.6 g (0.8 equivalent) dimethylolpropanoic acid was added and the reaction was continued at 80° C. until an NCO content of 3.5 wt.% was reached. Using a highly effective dissolver 327 g water was added, and immediately chain-lengthening was carried out with 12 g (0.41 equivalent) ethylenediamine and 6.9 g (0.21 equivalent) bis(2-aminoethyl)amine. This was followed by addition of 69.5 g (0.81 equivalent) adipic dihydrazide, then reacted for 1 hr with 32.5 g (0.41 equivalent) of a 37 wt. % aqueous solution of formalin in 30 g water at 45° C. The result was a coarse dispersion, which was stabile for only a few days and had substantial bottom residues. It was not possible to spread the dispersion with a doctor blade to form a clear, unitary film.

COMPARISON EXAMPLE B

Instead of the 355.2 g IPDI, 428.8 g 4,4'-methylenebis(cyclohexylisocyanate) was employed. The solution in N-methylpyrrolidone was extremely viscous. Therefore, acetone had to be added as an additional solvent. After the formalin solution was added, it was not possible to obtain a unitary dispersion, even by further dilution.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for preparing an aqueous polyurethane dispersion, comprising:
    (a) preparing a prepolymer with free NCO groups by reacting an aliphatic or cycloaliphatic polyisocyanate with a polyol, and an anionic compound;
    (b) dispersing said prepolymer in water;
    (c) reacting said water-dispersed prepolymer with a diamino hydrazide of the formula:

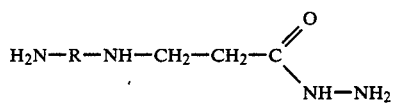

wherein R is an alkylene group of 2 to 15 carbon atoms or a cycloalkylene or arylene group of 6 to 15 carbon atoms as a chain-lengthening agent;
    (d) reacting the prepolymer of step (c) in said dispersion with formaldehyde to effect crosslinking.

2. The method of claim 1, wherein the solution of the prepolymer is a N-methylpyrrolidone or acetone solution, which solution comprises the prepolymer in the amount of at least 70 wt. %, and has a maximum viscosity of 10,000 mPa-sec.

3. The method of claim 1; wherein said group R has the structure:

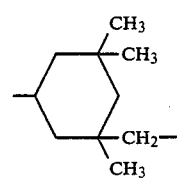

4. The method of claim 1, wherein said polyol is the polyester formed by reacting an aliphatic or aromatic dicarboxylic acid of 5 to 15 carbon atoms with a polyol of 2 to 15 carbon atoms and 2 to 4 OH groups per molecule.

5. The method of claim 1, wherein said polyol is a linear and trifunctional polycaprolactone.

6. The method of claim 1, wherein said polyol is a polyether.

7. The method of claim 1, wherein said anionic compound is a carboxylic acid or sulfonic acid of 10 or less atoms.

8. The method of claim 1, wherein said polyisocyanate is an aliphatic or cycloaliphatic diisocyanate of 6 to 15 carbon atoms.

9. A polyurethane dispersion prepared by the process of claim 1.

10. A method of preparing a film, comprising casting the aqueous polyurethane dispersion of claim 1 into a film.

* * * * *